United States Patent [19]

Yamaguchi et al.

[11] 4,430,680
[45] Feb. 7, 1984

[54] RECIPROCATING MEMBER CONTROL MECHANISM IN TAPE PLAYER

[75] Inventors: Katsumi Yamaguchi; Hitoshi Okada, both of Toda, Japan

[73] Assignee: Clarion Co., Ltd., Tokyo, Japan

[21] Appl. No.: 306,684

[22] Filed: Sep. 29, 1981

[30] Foreign Application Priority Data

Sep. 30, 1980 [JP] Japan ................................. 55-135157
Sep. 30, 1980 [JP] Japan ............................ 55-138082[U]

[51] Int. Cl.³ ............................................. G11B 15/00
[52] U.S. Cl. .................................... 360/137; 360/96.2
[58] Field of Search ................... 360/137, 62, 69, 105, 360/96.1, 96.2–96.3

[56] References Cited

U.S. PATENT DOCUMENTS 3,821,810  6/1974  Maruyama ..................... 360/137 X
4,342,055  7/1982  Osanai .................................. 360/69

*Primary Examiner*—John H. Wolff
*Attorney, Agent, or Firm*—Russell E. Hattis; Stephen R. Arnold

[57] ABSTRACT

In a magnetic tape recording/playing device, a reciprocating member control mechanism, in which reciprocating members employed in the channel change mechanism, FF (fast forward)/REW (rewind) mechanism and the like are interlocked with a cam which is driven by a rotary member driven by a tape drive motor, and provided between this rotary member and cam is an idler which is engaged with an electromagnetic plunger which is so arranged as to selectively transmit or shut off the rotation from the rotary member to the cam.

2 Claims, 7 Drawing Figures

RECIPROCATING MEMBER CONTROL MECHANISM IN TAPE PLAYER

BACKGROUND OF THE INVENTION

1. Field of the Invention

The present invention relates to a reciprocating member control mechanism in a tape player, and more particularly to a mechanism for reciprocating various control plates in channel changing mechanism and fast forward and rewinding mechanism in a tape player.

2. Description of the Prior Art

These years, there has been a strong need for more compact and thinner tape players for use as installed in cars such as car stereo players. For such need, the cassette pack cannot be modified in size, and if the reel bases, fylwheels, etc. for drive of the tape are limitlessly reduced in size, the performance of the tape player will be spoiled. Consequently, mainly the channel change mechansim, and tape fast forward and rewinding mechanism are to be modified for such more compact and thinner tape players.

The channel change mechanism is to switch the drive system for the reel bases and pinch rollers from the forward to reverse side or vice versa by reciprocating members called "change plate", "idler plate", etc. The fast forward and rewind mechanism is to set to fast forward (FF) or rewind (REW) mode the drive system for the reel bases and the head and pinch rollers by reciprocating the member called "head plate". It is widely adopted in tape players to utilize reciprocating members as changeover of the functional modes from one to another; accordingly, design for smaller members and reduction in number of parts in the abovementioned mechanisms will be greatly contributed to provision of more compact and thinner tape players.

In conventional tape players, however, the above-mentioned reciprocating members are moved as directly attracted or pressed mainly with the attractive force of a large electromagnetic plunger. Channel change and FF (fast forward)/REW (rewind) switching require a considerably large force; the plunger with a sufficient attractive force for this purpose is necessarily of a considerably large size. More particularly, the height of the plunger is so great as to a factor against the realization of more compact and thinner tape players. Of course, since such large electromagnetic plunger requires a large current, the transistors used in the control circuit must be of a correspondingly large capacity, which all are factors against the development of more compact and thinner tape players.

SUMMARY OF THE INVENTION

The present invention has a primary object to overcome the above-mentioned drawbacks of the prior art by providing a "reciprocating member control mechanism" for realization of more compact and thinner tape players, wherein the reciprocating members are driven by a tape drive motor and a cam operatively coupled with this motor and a small electromagnetic plunger for changeover of idlers is used to transmit the drive force of the motor to the cam.

The above and other objects and advantages of the present invention will be ssen from the ensuing description made by way of example of the preferred embodiments according to the present invention with reference to the accompanying drawings.

BRIEF DESCRIPTION OF THE DRAWINGS

FIGS. 1 and 2 are plan views, respectively, of one embodiment of the reciprocating member control mechanism according to the present invention, FIG. 1 showing the mechanism in position for forward drive of the tape while FIG. 2 shows the mechanism in position for reverse drive of the tape;

DETAILED DESCRIPTION OF THE PREFERRED EMBODIMENTS

Figure 1:
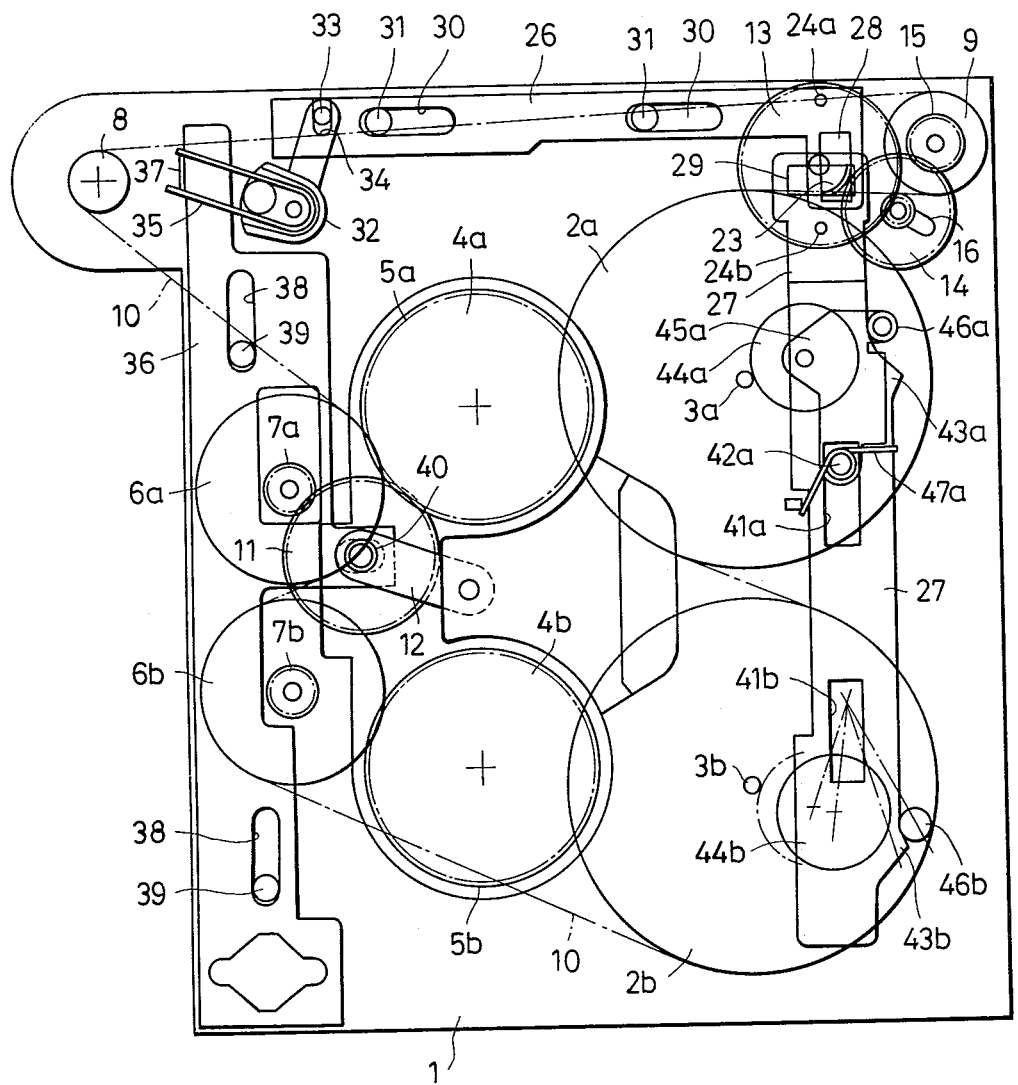

In the illustrated embodiment, the reciprocating members include channel changing sliding plate and change plate.

Referring to the drawings, the reference code C shows a cassette pack and reference numeral 1 is a chassis of tape player.

On the bottom face of the chassis 1, there are provided a forward- and reverse-side flywheels 2a and 2b, of which the shafts are protruded at the upper portions thereof above the chassis and serve as the capstan shafts 3a and 3b. There is disposed in the center of the chassis 1 a pair of reel bases 4a and 4b which have driven gears 5a and 5b formed on the outer circumferences of the portions thereof positioned in the lower portion of the chassis 1. On the side of the reel bases 4a and 4b opposite to the flywheels 2a and 2b, there are disposed a pair of pulleys 6a and 6b which have formed integrally therewith a drive gears 7a and 7b, respectively, at the upper portions thereof. In the corner on the pulley side of the chassis 1, there is provided a motor pulley 8 which is driven by a motor, while an intermediate pulley 9 is provided in the corder on the opposite side. This intermediate pulley 9 is a rotary member which serves to drive the reciprocating members. A loop-like belt 10 is threaded over the motor pulley 8, intermediate pulley 9, flywheels 2a and 2b, and pulleys 6a and 6b. Particularly in the section including the flywheels 2a and 2b as well as the pulleys 6a and 6b, the belt 10 is laid in the form of "S" which provides the rotations of forward- and reverse-side flywheels and pulleys in directions opposite to each other.

There is provided an idler gear 11 between the reel bases 4a and 4b and drive gears 7a and 7b; this idler gear 11 is fitted to the end of a changeover plate 12 pivotably mounted to the chassis and, as the changeover plate 12 pivots, engages the drive gear 7a and reel base 4a on the forward side, or the drive gear 7b and reel base 4b on the reverse side.

Near the intermediate pulley 9, there are provided a cam gear 13 for channel change and a channel change idler gear 14 for transmission of the rotation from the intermediate pulley 9 to said cam gear 13.

First, the intermediate pulley 9 has formed integrally therewith a drive gear 15 for engagement with the idler gear 14. The idler gear 14 is composed of a large gear for engagement with the drive gear 15 on the intermediate pulley side and a small gear for engagement with the cam gear 13, the idler gear shaft being inserted into a arc-like guide hole 16 formed in the chassis 1 and protruding above the chassis. In the upper portion of the chassis, there is fixed an electromagnetic plunger 17 for changeover of the idler gears and a plunger plate 18 which is moved by the elctromagnetic plunger 17. This plunger plate 18 is made of an L-shaped plate of which the vertical portion is engaged with the core of the electromagnetic plunger 17. The horizontal portion of the plunger plate 18 had formed therein 2 in the moving direction of the core 2 elongated holes 19, for example, in which guide pins 20 on the chassis 1 side are fitted, and perpendicular to the elongated holes 19 an elongated hole 21 in which the shaft of said channel change idler gear 14 is slidably fitted. Further, there is provided between the plunger plate 18 and chassis 1 a spring 22 for returning the plunger plate (idler gear) 18.

There is provided on the bottom face of said cam gear 13 a protruding cam 23 made of a plate curved in the form of an arc; this cam 23 has both the ends thereof so disposed as to form together an angle of 90° with respect to the center of the cam gear 13. A column-like cam having a section in the form of sector may be substituted for this plate-like cam. The cam gear 13 has provided at the top face thereof a pair of pins 24a and 24b extending perpendicularly on the opposite sides of the shaft of this cam gear. These pins 24a and 24b are to push and switch the contact of a leaf switch 25 fixed to the chassis 1; this leaf switch 25 is to deenergize said electromagnetic plunger 17.

Engaged with the cam 23 are a sliding plate 26 which is to let the idler gears 11 of the reel bases 4a and 4b and a change plate 27 which is to change the pinch rollers on the forward and reverse sides from one to another. The sliding plate 26 and change plate 27 are disposed perpendicular to the bottom face of the chassis 1, and at the intersecting portion there is provided the cam 23. Further, the sliding plate 26 has formed in the end thereof perpendicularly to the moving direction thereof an elongated engagement hole 28 in which the cam is fitted. Also, the change plate 27 has formed therein perpendicular to the moving direction thereof an elongated engagement hole 29 in which the cam 23 is fitted.

The sliding plate 26 is mounted with a pair of guide holes 30 formed therein and a pair of guide pins 31 provided on the chassis 1 so as to be freely reciprocated relative to the chassis. There is pivotably provided a link 32 on the chassis 1 on side of the other end of the sliding plate 26. This link 32 has provided at one end thereof a pin 33 which is slidably engaged in a cut 34 formed in the other end of the sliding plate. The other end of the link 32 is composed of a spring 35 bent in a "U" shape of which the ends support an engagement piece 37 formed at the end of an idler plate 36 which is disposed perpendicular to the sliding plate 26. This idler plate 36 is fitted with a pair of guide holes 38 formed therein and guide pins 39 provided on the chassis 1 so as to be freely reciprocated relative to the chassis 1. Nearly in the center of the idler plate 36 formed is a protrusion toward the idler gear 11. There is formed in this portion an engagement hole 40 for insertion of the shaft of the idler gear 11. This engagement hole 40 is elongated perpendicularly to the idler plate 36 corresponding to the arc-like orbit delineated by the idler gear 11 along with the change plate 12.

The change plate 27 is fitted with a pair of guide holes 41a and 41b formed therein and a pair of pins provided on the chassis 1 so as to be freely reciprocated relative to the chassis 1. Further, the change plate 27 has formed on the side edges thereof a pair of slanted cams 43a and 43b shaped symmetrically to change the pinch rollers on the forward and reverse sides from one to another. The slant cams 43a and 43b have a stepped shape consisting of contact sides near the capstan shafts 3a and 3b and separate sides formed off the capstan shafts; between these different sides formed are slan sides which form together an angle.

Forward- and reverse-side pinch rollers 44a and 44b are mounted on the pins 42a and 42b, respectively, protruding above the chassis 1. The base ends (not shown) of roller cases 45a and 45b are pivotably mounted on the protruding portions of the pins 42a and 43b, and the other ends of said roller cases bear the pinch rollers 44a and 44b. There are fixed on the backs of the roller cases roller-like cam followers 46a and 46b protruding below the chassis 1, which cam followers being engaged with the slanted cams 43a and 43b on the change plate 27. Further, fixed to the pins 42a and 42b are torsion springs 47a and 47b of which the one end rests on the roller case while the other end rests on the protrusion of the chassis 1, thus forcing the pinch rollers 44a and 44b to the capstan shafts 3a and 3b.

The reciprocating member control mechanism has such a construction as have been described in the foregoing, and this mechanism functions as described below:

First in order to forwardly feed the tape, the pinch roller 44a is forced to the forward-side capstan shaft 3a as shown in FIG. 1 to feed the tape forwardly, while the idler gear 11 is engaged with the reel base on the forward side to rotate the reel base 4a on the forward side for rewind the tape. In this case, the capstan shaft 3a is driven by the belt 10 over the flywheel 2a, while the rotation of the forward-side pulley 6a driven by the same belt 10 is transmitted through the idler gear 11 to the reel base 4a which will thus be rotated. In this condition, the reverse-side pinch roller 44b is separate from the capstan shaft 3b, and the tape passing between them is not in contact with them because the change plate 27 moves on this side as viewed in the plane of FIG. 1 and the cam follower 46b of the reverse-side pinch roller 44b is positioned in the portion formed on the change plate 27 to separate the slanted cam 43b.

In order to change the channels from one to another to reverse the running direction of the tape, a signal is sent from the manual change button or the tape end detector located at the end of the tape to energize the electromagnetic plunger 17. Then, the plunger plate 18 is moved as attracted by the core of the electromagnetic plunger 17 so that the channel change idler gear 14 engaged with the plunger plate 18 is moved, as attracted, along the arc-shaped guide 16 on the chassis 1. The idler gear 14 thus moved gets in mesh with the drive gear 15 of the intermediate pulley 9 and the cam gear 13 to transmit the rotation of the intermediate pulley 9 to the cam gear 13. When the cam gear 13 starts rotating, one end of the arc-shaped cam 23 fixed to this pulley presses the side edge of the engagement hole 28 in the sliding plate 26 to the link 32. When the cam 23 rotates 90° clockwise from the starting point shown in FIG. 2, the end of the cam 23 gets out of engagement with the side edge of the engagement hole 28, and since the circumferencial edge of the cam 23 keeps pressing the same side edge of the engagement hole, the sliding plate 26 will be stopped in a position which the plate 26 has arrived as moved. If the cam gear 13 kept rotating more than 90° from the start point, one end of the cam 23 will push the edge of the engagement hole 29 on the change plate 27 to move it upward as viewed in the plane of FIG. 1. When the cam 23 arrives at a position of 180° from the start point, the pin 24b provided on the cam gear 13 extending perpendicularly pushes the leaf switch 25 which will produce a command signal to deenergize the electromagnetic plunger 17.

As the electromagnetic plunger is deenergized, the plunger plate 18 is returned as attracted by the return spring 22 to the initial position, and also the channel change idler gear 14 engaged with the plate 18 is returned to the initial position, thereby disengaging the intermediate pulley 9 from the cam gear 13. As the result, even if the intermediate pulley 9 is normally rotated by the belt 10, the rotation of the pulley is transmitted to the cam gear 13 only for an extremely short time of channel change, thus there being no possibility of inadvertent rotation of the cam gear for other time than of channel change.

Figure 2:
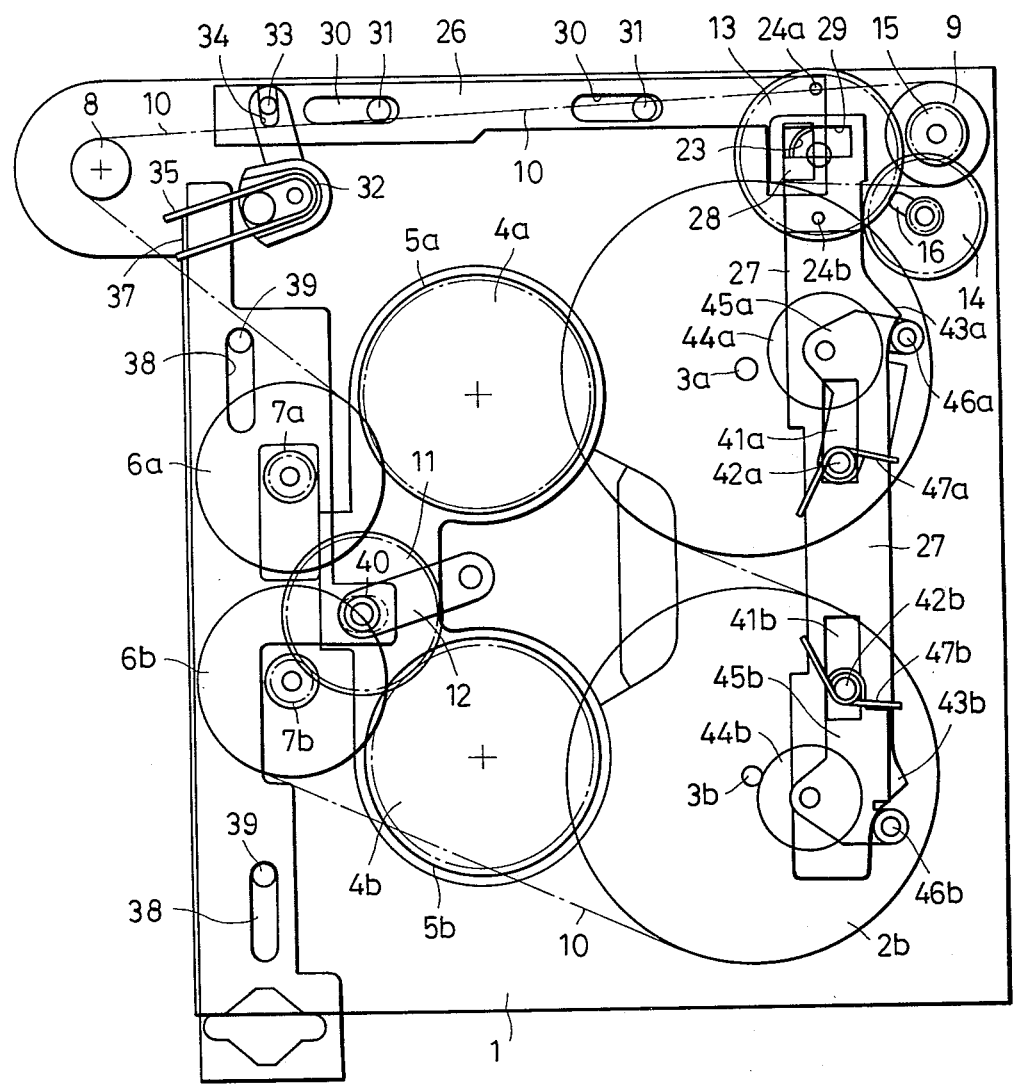
Figure 3:
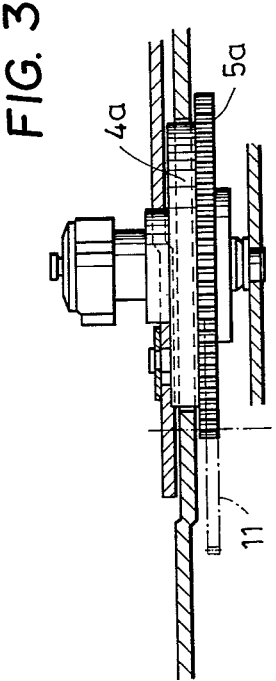
FIG. 3 is a sectional view of the reel base of the embodiment in FIGS. 1 and 2.
Figure 4:
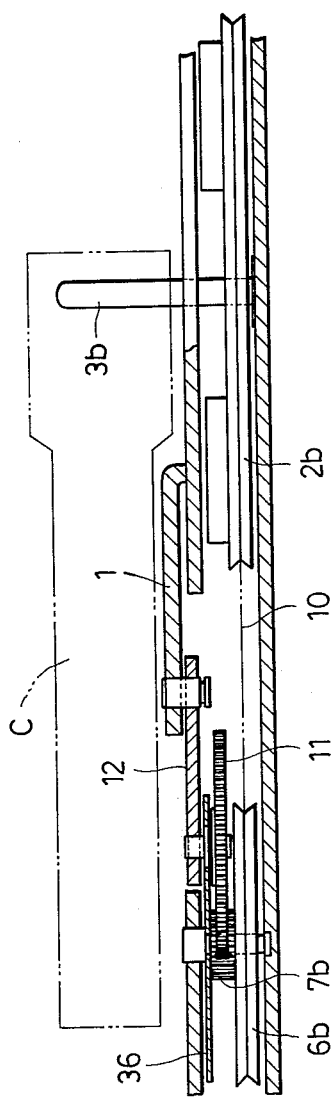
FIG. 4 is a sectional view of the pulleys and idler gear.
Figure 5:
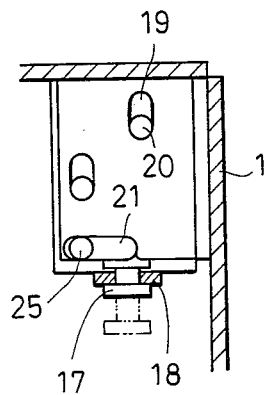
FIG. 5 is a plan view of the plunger plate.
Figure 6:
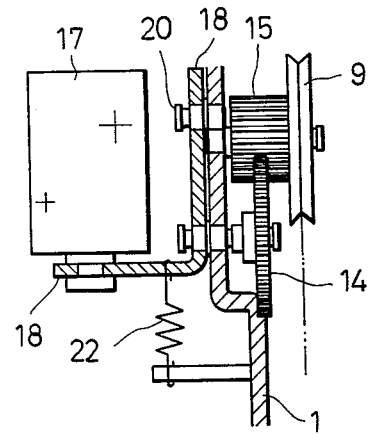
FIG. 6 is a sectional view of the electromagnetic plunger and intermediate pulley.
Figure 7:
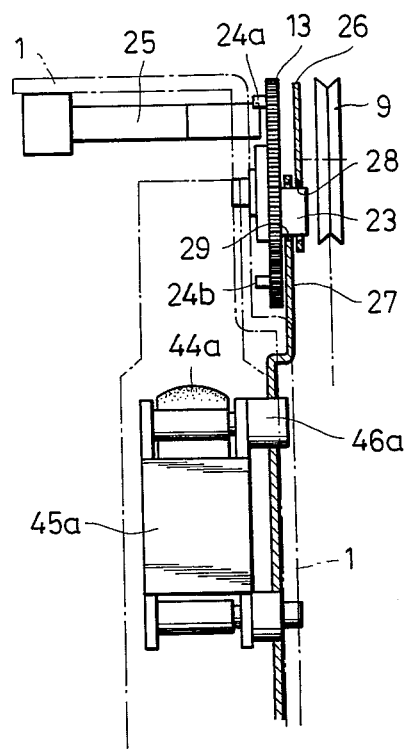
FIG. 7 is a sectional view of the pinch roller and change plate.

When the cam 23 lets the sliding plate 26 and change plate 27 move in this way, the reel base driving idler gear 11 and the pinch roller are changed over to the reverse side as shown in FIG. 2.

First, when the sliding plate 26 is moved, the link 32 engaged with the other end of the plate 26 is pivoted and pushes the idler plate 36 engaged with the spring 35 of the link 32. When the idler plate 36 is thus moved, the idler gear 11 moves along with the change plate 12 since the shaft of the idler gear 11 is inserted in the engagement hole 40 formed nearly in the center of the idler plate 36, and so the idler gear 11 gets in mesh with the drive gear 7b on the reverse-side pulley 6b and the reel base 4b. As the result, the rotation of the reverse-side pulley 6b is transmitted to the reel base 4b which will in turn be rotated in a direction opposite to the forward-side reel base 4a, thus taking up the tape running on the reverse side.

On the contrary, as the change plate 27 is moved, the pair of slanted cams 43a and 43b formed on the plate 27 are moved. The cam follower 46a of the forward-side pinch roller is moved from the contact portion of the slanted cam 43a to the separating portion; along with this movement, the forward-side pinch roller 44b moves away from the capstan shaft 3a against the force of the torsion spring 47a. On the other hand, the cam follower 46b of the reverse-side pinch roller 44b moves towards the contact portion of the slanted cam 43b, and so the reverse-side pinch roller 44b is forced to the capstan shaft 3b to catch the tape for run on the reverse side. In this case, since there are formed on the slanted cams 43a and 43b slopes which form together an angle, the cam follower, having been moved once to between the contact and separating portions, will not possibly be returned to the initial position.

In order to return again to the forward side the control mechanism changed over to the reverse side as having been described, the electromagnetic plunger 17 is similarly energized to move the channel change idler gear 14, thus transmitting the rotation of the intermediate pulley 9 to the cam gear 13. The cam gear 13 will be rotated further from the angular position of 180° so that the cam 23 returns the sliding plate 26 to its initial position (on the forward side). When the cam gear rotates over the angular position of 270°, the channel change idler plate 27 is returned to the forward position. When the cam gear returns to the start point of rotation, another pin 24a provided on the cam gear 13 pushes the leaf switch 25 so that the electromagnetic plunger is deenergized, thus ceasing the transmission of the rotation to the cam gear 13. After the sliding plate 26 and change plate 27 are moved to the forward side in this way, the idler gear 11 and pinch roller operatively coupled to these plates are changed to the ones on the forward side to make the tape run forwardly and at the same time rewind it.

As having been described in the foregoing, the control mechanism according to the present invention is to take the drive force for the reciprocating members from a tape drive motor through a rotary means (intermediate pulley, for example, as shown in the drawings. Accordingly, the electromagnetic plunger may be any small one which moves the idler to transmit the rotation of the rotary means to the cam. Compared with the conventional tape players in which the reciprocating members are directly moved as attracted by means of electromagnetic plunger, the plunger can be designed to be extremely compact, thus eliminating the disadvantages of the prior art in that the electromagnetic plunger is a factor to make it impossible to realize a more compact tape player.

In the foregoing, the present invention has been described with reference to the preferred embodiment in which the rotation tramsmitting means including idler gear are made of gears; however, it should be noted that rubber-made idler rollers may be substituted for such gears. In the preferred embodiment illustrated, an intermediate pulley which is driven by belt is used as rotary means to rotate the cam for channel change. As in the case in which the cam is disposed near the motor so as to directly take the rotation from the motor, other rotary means may be used as drive source for the cam.

We claim:

1. A control mechanism for a magnetic tape playing device having a tape drive motor, forward and reverse drive reelbases, forward and reverse drive capstan shafts driven by said motor, forward and reverse drive pulleys driven by said motor, said control mechanism comprising: first drive changeover means supported to be reciprocated for selectively supplying drive power from said motor to said forward and reverse drive reelbases; second drive changeover means supported to be reciprocated for selectively engaging said forward and reverse drive capstan shafts to an inserted tape; a power takeoff pulley drive by said motor; an engagement means for selectively actuating engagement with said first and second drive changeover means; an electromagnetic plunger means; and a rotation transmitting means operable by said electromagnetic plunger means to impart the rotation from said power takeoff pulley to said engagement means, said first drive changeover means including a slider plate mounted for reciprocation, an idler plate mounted for reciprocation and coupled to be driven by said slider plate, an idler movably responsive to the position of said idler plate to be selectively interposable to couple said forward drive pulley to said forward drive reelbase or said reverse drive pulley to said reverse drive reelbase, said second drive changeover means including a pair of displaceable pinch rollers for pressing said tape against said forward and reverse drive capstan shafts respectively, a change plate mounted for reciprocation and coupled to actuate said pinch rollers selectively against their associated capstan shafts, said engagement means including an arc-shaped cam rotatably provided on a cam gear, there being formed in said slider plate and change plate elongated holes in which said cam is engaged, the width of said elongated hole being nearly equal to the radius of said can so that the arc-shaped circumferential surface of said cam is slidable along the edge portion of said elongated hole, said rotation transmitting means including a movable idler gear coupled with said plunger means and a driving gear provided on said power take-off pulley, said idler gear being engageable with said driving gear and said cam gear when said plunger means is energized.

2. A control mechanism as set forth in claim 1, wherein said change plate has provided thereon a pair of slanted cams which actuate said pinch rollers to selectively engage said capstan shafts.

* * * * *